(12) United States Patent
Mogi et al.

(10) Patent No.: US 8,588,543 B2
(45) Date of Patent: Nov. 19, 2013

(54) APPARATUS, METHOD AND PROGRAM FOR FILTERING DATA SIGNALS USING LOW-FREQUENCY AND COMPENSATING FILTERS

(75) Inventors: Yukihiko Mogi, Kanagawa (JP); Ken Tamayama, Tokyo (JP)

(73) Assignee: Sony Corporation, Tokyo (JP)

( * ) Notice: Subject to any disclaimer, the term of this patent is extended or adjusted under 35 U.S.C. 154(b) by 96 days.

(21) Appl. No.: 13/282,922

(22) Filed: Oct. 27, 2011

(65) Prior Publication Data

US 2012/0163729 A1    Jun. 28, 2012

(30) Foreign Application Priority Data

Dec. 28, 2010 (JP) ................................. 2010-293307

(51) Int. Cl.
*G06K 9/40* (2006.01)
(52) U.S. Cl.
USPC ........................................................ 382/264

(58) Field of Classification Search
None
See application file for complete search history.

(56) References Cited

U.S. PATENT DOCUMENTS

| 7,439,884 | B2 | 10/2008 | Mogi et al. |
| 2006/0187242 | A1* | 8/2006 | Lee et al. ..................... 345/690 |
| 2009/0147124 | A1 | 6/2009 | Taniyama et al. |

FOREIGN PATENT DOCUMENTS

| JP | 2007-72558 | 3/2007 |
| JP | 2009-141742 | 6/2009 |

* cited by examiner

*Primary Examiner* — Nirav G Patel
(74) *Attorney, Agent, or Firm* — Sony Corporation (57) ABSTRACT

A signal processing apparatus includes: a first low-pass filter filtering a data signal; and a convolving section convolving low frequency components of the data signal obtained by the first low-pass filter with a compensation filter for compensating for signal degradation attributable to low frequency components of impulse response obtained by filtering the impulse response with a second low-pass filter.

20 Claims, 12 Drawing Sheets

G COMPONENTS                R AND B COMPONENTS

FIG.17

APPARATUS, METHOD AND PROGRAM FOR FILTERING DATA SIGNALS USING LOW-FREQUENCY AND COMPENSATING FILTERS

FIELD

The present disclosure relates to a signal processing apparatus, a signal processing method, and a signal processing program.

BACKGROUND

Imaging apparatus utilizing an imaging device such as a CCD or a CMOS have recently spread, such apparatus shooting an optical image of an object formed on a light-receiving surface of the imaging device by a group of imaging lenses. The image obtained by such an imaging apparatus has a resolution corresponding to the number of light-receiving pixels on the light-receiving surface and the resolution of the imaging lens.

Therefore, increase in the number of the light-receiving pixels and improvement in the resolution of the imaging lens are effective for improving the resolution of the image obtained by the imaging apparatus. For example, the resolution of an image obtained by such an imaging apparatus can be improved by increasing the density of light-receiving pixels provided on the light-receiving surface and improving the resolution of the imaging lens group such that a point image projected on the light-receiving surface through the imaging lens group stays within the range of one light-receiving pixel.

As a result of technological advances made in recent years, it has become relatively easy to increase the density of light-receiving pixels forming an imaging device. One effective way of improving the resolution of a group of imaging lenses is to reduce errors in shaping and assembling lenses forming the imaging lens group. However, it is highly difficult to improve accuracy of manufacture of such lenses, i.e., accuracy of processing, assembling, and adjustment.

As another approach toward improved resolution, JP-A-2009-141742 (Patent Document 1) discloses a method of improving the resolution of an image obtained by an imaging apparatus, the method including the step of performing signal processing of the image based on a PSF (point spread function).

JP-A-2007-72558 (Patent Document 2) discloses an image processing method including the steps of dividing frequency components of an input image into several bands using a band division filter and convolving only low-frequency components of the input signal with the inverse of point spread functions to duplicate convolved computational loads.

SUMMARY

The image processing method disclosed in Patent Document 2 has a problem in that an image cannot be reconstructed with a sufficiently high resolution because of the influence of a band division filter.

Under the circumstance, it is desirable to provide a novel and improved signal processing apparatus, signal processing method, and signal processing program which allow a data signal convolved with an impulse response such as a point spread function to be compensated with high accuracy.

An embodiment of the present disclosure is directed to a signal processing apparatus including a first low-pass filter filtering a data signal and a convolving section convolving low frequency components of the data signal obtained by the first low-pass filter with a compensation filter for compensating for signal degradation attributable to low frequency components of impulse response obtained by filtering the impulse response with a second low-pass filter.

The first low-pass filter and the second low-pass filter may have the same characteristics.

The signal processing apparatus may further include an adding section adding results of the convolution performed by the convolving section and the data signal.

The data signal may be an image signal. The image processing apparatus may further include an adjusting section adjusting results of convolution associated with a certain region performed by the convolving section based on edge information of the region. The adding section may add results of the adjustment performed by the adjusting section and the data signal.

The adjusting section may adjust the results of convolution associated with the region based on the edge information such that a higher gain is obtained for the weaker edge components in the region.

Another embodiment of the present disclosure is directed to a signal processing method including filtering a data signal with a first low-pass filer, filtering impulse response with a second low-pass filter, designing a compensation filter compensating for signal degradation attributable to low frequency components of the impulse response obtained with the second low-pass filter and convolving low frequency components of the data signal obtained by the first low-pass filter with the compensation filter.

Still another embodiment of the present disclosure is directed to a program for causing a computer to function as a signal processing apparatus including a first low-pass filter filtering a data signal and a convolving section convolving low frequency components of the data signal obtained by the first low-pass filter with a compensation filter for compensating for signal degradation attributable to low frequency components of impulse response obtained by filtering the impulse response with a second low-pass filter.

As described above, according to the embodiments of the present disclosure, a data signal convolved with impulse response such as point spread functions can be compensated with high accuracy.

DETAILED DESCRIPTION

Embodiments of the present disclosure will now be described in detail with reference to the accompanying drawings. In the following description and the accompanying drawings, elements which are substantially identical in functions and configuration will be indicated by the same reference numeral. Details of such an element may be omitted to avoid duplicated description.

In the following description and the accompanying drawings, a plurality of elements substantially identical in functions and configuration may be distinguished from each other by different alphabets following a reference numeral which is the same for all of the elements. When there is no need for distinguishing the plurality of elements substantially identical in functions and configuration from each other, the elements are indicated only by the same reference numeral.

The embodiments of the present disclosure will be described according to the following order.
1. Basic Configuration of Image Processing Apparatus
2. Image Processing Performed by Comparative Example
3. First Embodiment
3-1. Configuration of Signal Processing Section of the First Embodiment
3-2. Operations of First Embodiment
4. Second Embodiment
4-1. Configuration of Signal Processing Section of the Second Embodiment
4-2. Operations of Second Embodiment
5. Summary of the description

<1. BASIC CONFIGURATION OF IMAGE PROCESSING APPARATUS>

The present disclosure may be implemented in various modes such as the modes described in detail in "3. First Embodiment" and "4. Second Embodiment" by way of example. An image processing apparatus (signal processing apparatus) according to each of the embodiments includes:

A. a first low-pass filter 220B for filtering a data signal; and

B. a convolving section 240 for convolving low-frequency components of the data signal obtained by the first low-pass filter with a compensation filter for compensating for signal degradation attributable to low-frequency components of an impulse response obtained by filtering the impulse response with a second low-pass filter 220B.

A basic configuration as thus described which is common to the embodiments of the present disclosure will now be described with reference to FIGS. 1 to 3.

Figure 1:
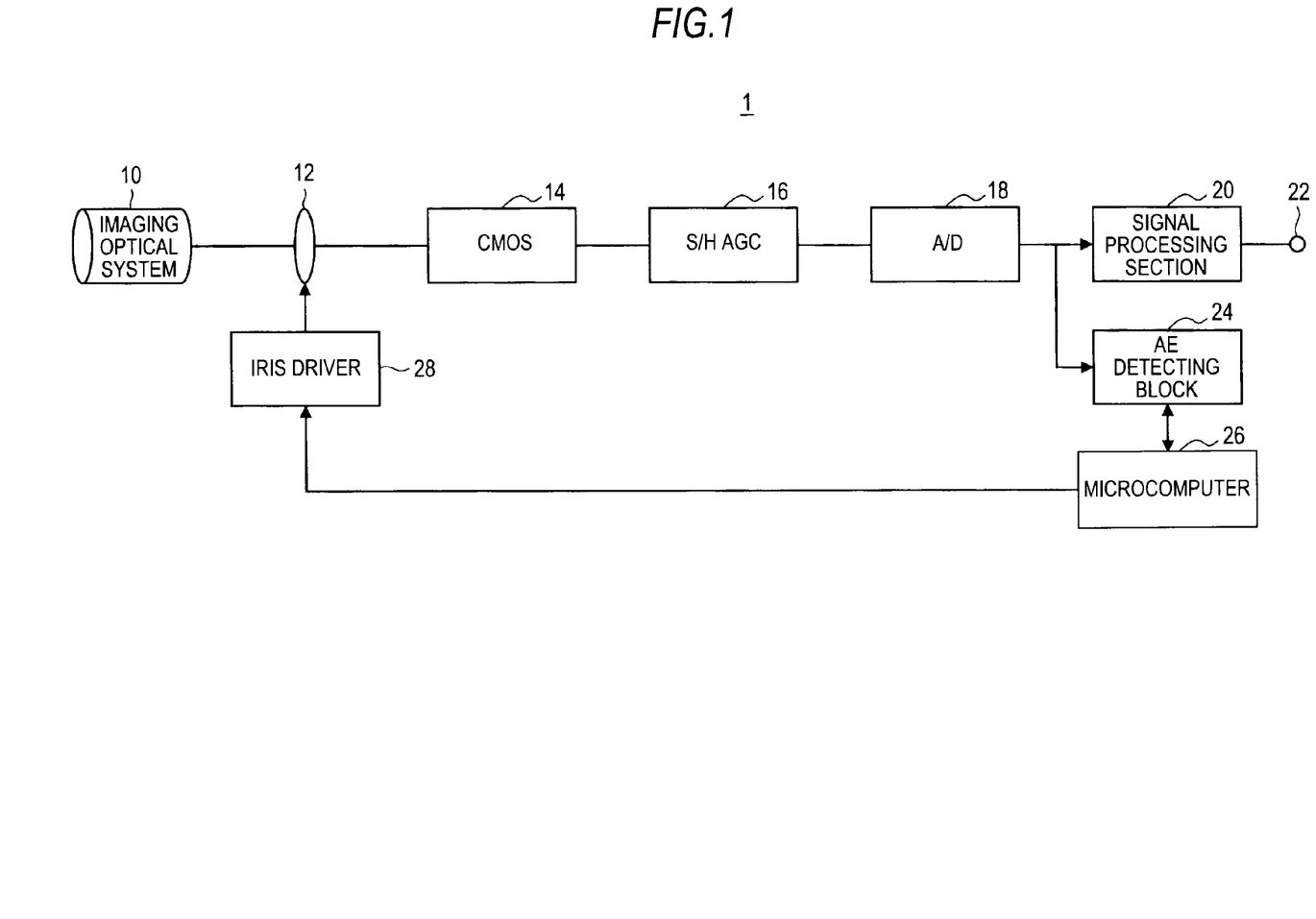
FIG. 1 is a diagram showing a configuration of an image processing apparatus according to an embodiment of the present disclosure.

FIG. 1 is a diagram showing a configuration of an image processing apparatus 1 according to an embodiment of the present disclosure. As shown in FIG. 1, the image processing apparatus 1 according to the embodiment of the present disclosure includes an imaging optical system 10, an iris 2, a CMOS imaging device 14, an S/H AGC section 16, an A-D conversion section 18, an AE detecting block 24, a microcomputer 26, and an iris driver 28. The image processing apparatus 1 according to the embodiment of the present disclosure may be used as various types of apparatus such as imaging apparatus, mobile apparatus, in-vehicle apparatus, and medical apparatus.

The imaging optical system 10 includes a plurality of lenses, and the system forms an optical image of an object on a light-receiving surface of the CMOS imaging device 14 through the iris 12.

The CMOS (complementary metal oxide semiconductor) imaging device 14 converts the optical image formed on the light-receiving surface into an electrical signal. The CMOS imaging device 14 is merely an example of an imaging device usable in the embodiment. For example, the image processing apparatus 1 may alternatively includes a CCD (charge coupled device) imaging device instead of the CMOS imaging device 14.

The S/H AGC section 16 performs sample-and-hold (S/H) operations on an output from the CMOS imaging device 14 and exercises AGC (automatic gain control) over the same. The A-D conversion section 18 converts an output from the S/H AGC section 16 into a digital format. A digital signal output from the A-D conversion section 18 is supplied to a signal processing section 20 and the AE detecting block 24.

The signal processing section 20 performs various types of signal processing on a digital output from the A-D conversion section 18 and outputs the processed signal to a circuit provided downstream thereof through an output terminal 22. For example, the signal processing section 20 performs signal processing to improve the resolution of an input image input thereto as a digital output as will be detailed later as embodiments of the present disclosure.

The AE (automatic exposure) detecting block 24 detects a digital signal input from the A-D conversion section 18. The microcomputer 26 supplies a control signal for controlling the opening of the iris 12 to the iris driver 28 based on a detection value supplied from the AE detecting block 24. The iris driver 28 drives the iris 12 according to the control signal supplied from the microcomputer 26.

(Bayer Pattern)

The CMOS imaging device 14 has pixels arranged in a Bayer pattern. The Bayer pattern will be described below with reference to FIG. 2.

Figure 2:
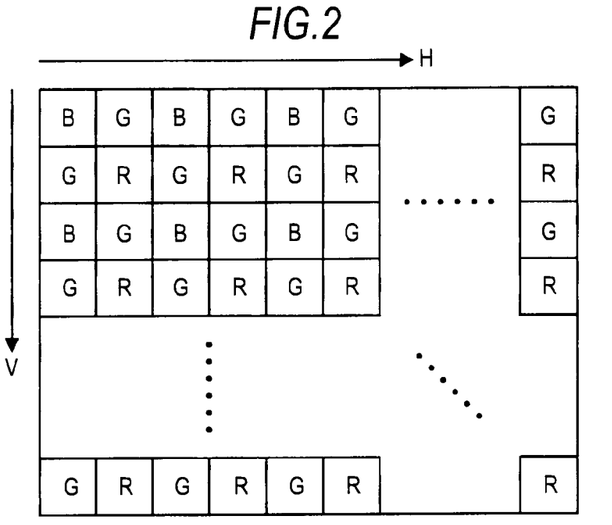
FIG. 2 is an illustration of an arrangement of pixels on a light receiving surface of a Bayer pattern type CMOS imaging device.

FIG. 2 is an illustration of an arrangement of pixels on the light receiving surface of the Bayer pattern type CMOS imaging device 14. As shown in FIG. 2, pixels detecting B (blue) components and pixels detecting G (green) components are alternately arranged on a first line (top line) extending the horizontal direction of the Bayer pattern, and pixels detecting G components and pixels detecting R (red) components are alternately arranged on a second line of the pattern. A plurality of lines having a similar pixel arrangement is provided in the vertical direction (represented by "V") of the pattern. Photoelectric conversion is performed at each pixel to allow a color image to be output from the CMOS imaging device 14.

Figure 3:
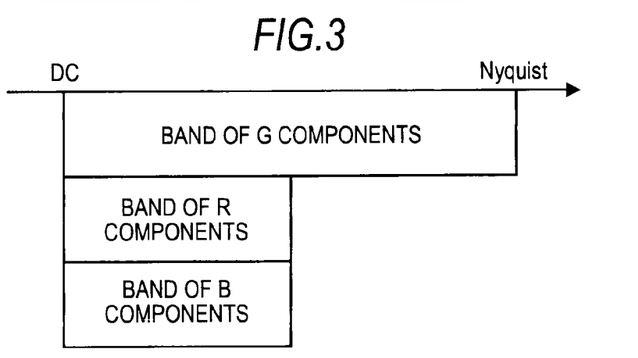
FIG. 3 is a conceptual illustration of frequency bands of an image having a Bayer pattern.

FIG. 3 is a conceptual illustration of frequency bands of an image having a Bayer pattern. As shown in FIG. 3, in the light of sampling, G components in an image having a Bayer pattern has a bandwidth twice as large as those of R and B components.

<2. Image Reconstruction Process in Comparative Example<

A basic configuration of an image processing apparatus according to an embodiment of the present disclosure has been described. An image reconstruction process performed in a comparative example will now be described with reference to FIGS. 4 to 9.

Figure 4:
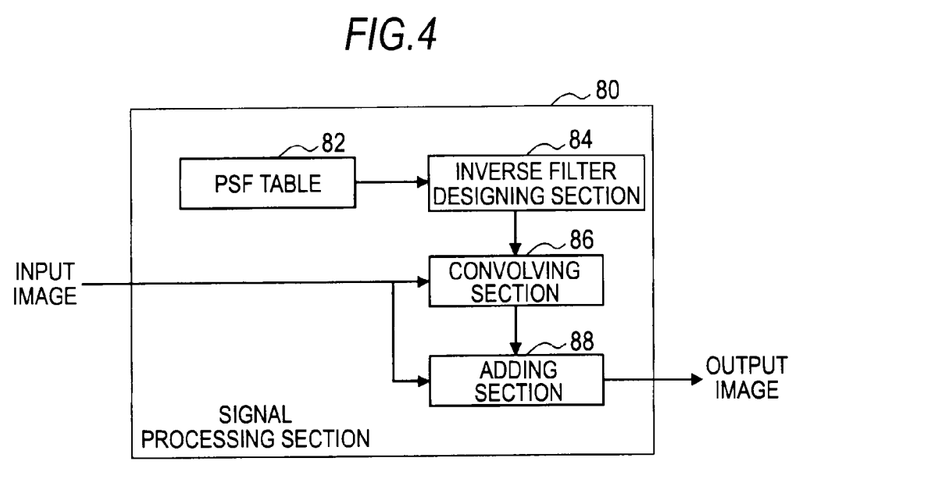
FIG. 4 is a functional block diagram showing a configuration of a signal processing section as a comparative example.

FIG. 4 is a functional block diagram showing a configuration of a signal processing section 80 which is a comparative example. The signal processing section 80 as a comparative example includes a PSF table 82, an inverse filter designing section 84, a convolving section 86, and an adding section 88.

Point spread functions P(z) which are defined in association with each of R, G, and B components and each of pixels are held in the PSF table 82. The point spread functions are non-uniformly distributed in a screen, and differences between the point spread functions of pixels neighboring each other are not necessarily large. Therefore, point spread functions within a block having a certain expanse may be uniformly approximated. For example, the point spread functions are acquired using the method disclosed in Patent Document 1. Alternatively, the point spread functions used may be optical design values.

The inverse filter designing section 84 designs inverse filters K(z) of the point spread functions P(z) in association with each of R, G, and B components and each pixel. For example, the inverse filter designing section 84 designs inverse filters K(z) using the method disclosed in Patent Document 1 or a method of minimizing a mean square error from an input signal based on a wiener filter.

Specifically, the inverse filter designing section 84 can design an inverse filter K(z) by calculating frequency response K(w) of an inverse filter according to Expression 1 shown below and performing an inverse Fourier transform of the frequency response K(w) of the inverse filter. In Expression 1, P(w) represents frequency response of a PSF, and N(w) represents frequency response of a noise component.

$$K(w) = J(w) - 1$$
$$J(w) = \frac{P^*(w)}{P(w)P^*(w) + N(w)}$$
Expression 1

The convolving section 86 convolves R, G, and B components of an input image X(z) in a Bayer pattern with an inverse filter $K_r(z)$ for R components, an inverse filter $K_g(z)$ for G components, and an inverse filter $K_b(z)$ for B components calculated by the inverse filter designing section 84, respectively. Such calculations performed by the convolving section 86 are shown in Expression 2 below. In Expression 2, $X_r(z)$, $X_g(z)$, and $X_b(z)$ represent R, G, and B components in an input image, respectively.

$$Y_r(z) = K_r(z)X_r(z)$$
$$Y_g(z) = K_g(z)Z_g(z)$$
$$Y_b(z) = K_b(z)Z_b(z)$$
Expression 2

The adding section 88 adds results Y(z) of convolution obtained by the convolving section 86 to each of the R, G, and B components of the input image as shown in Expression 3. In Expression 3, $O_r(z)$, $O_g(z)$, and $O_b(z)$ represent R, G, and B components in a resultant output image, respectively.

$$O_r(z) = X_r(z) + Y_r(z)$$
$$O_g(z) = X_g(z) + Y_g(z)$$
$$O_b(z) = X_b(z) + Y_b(z)$$
Expression 3

Figure 5:
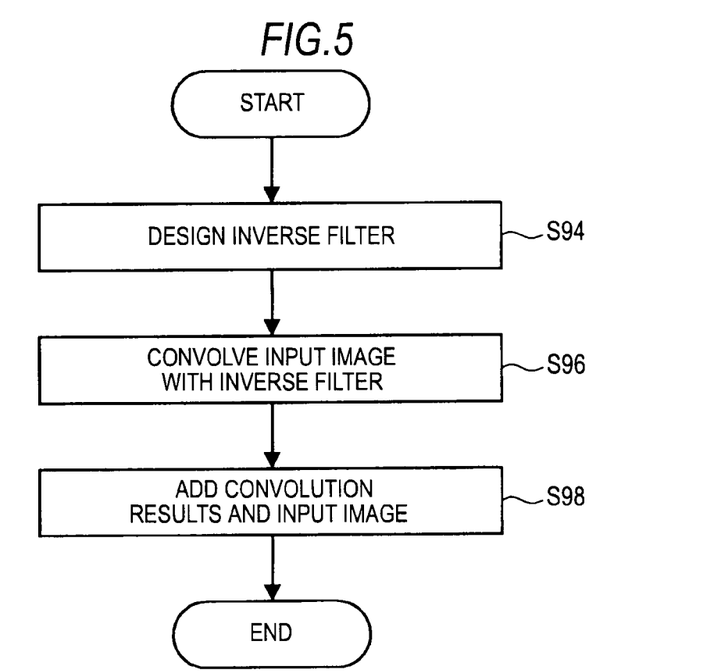
FIG. 5 is a flow chart showing operations of the signal processing section as a comparative example.

A configuration of the signal processing section 80 as a comparative example has been described above. Operations of the signal processing section 80 will be described below with reference to FIG. 5.
(Step S94)
As shown in FIG. 5, the inverse filter designing section 84 designs an inverse filter K(z) of a point spread function P(z) in association with each of R, G, and B components and each pixel, for example, as shown in Expression 1.
(Step S96)
Thereafter, the convolving section 86 convolves R, G, and B components of an input image X(z) in a Bayer pattern with an inverse filter $K_r(z)$ for R components, an inverse filter $K_g(z)$ for G components, and an inverse filter $K_b(z)$ for B components calculated by the inverse filter designing section 84, respectively (S96).
(Step S98)
The adding section 88 adds results Y(z) of convolution obtained by the convolving section 86 to each of the R, G, and B components of the input image, for example, as shown in Expression 3 and outputs an output image O(z).

Figure 6:
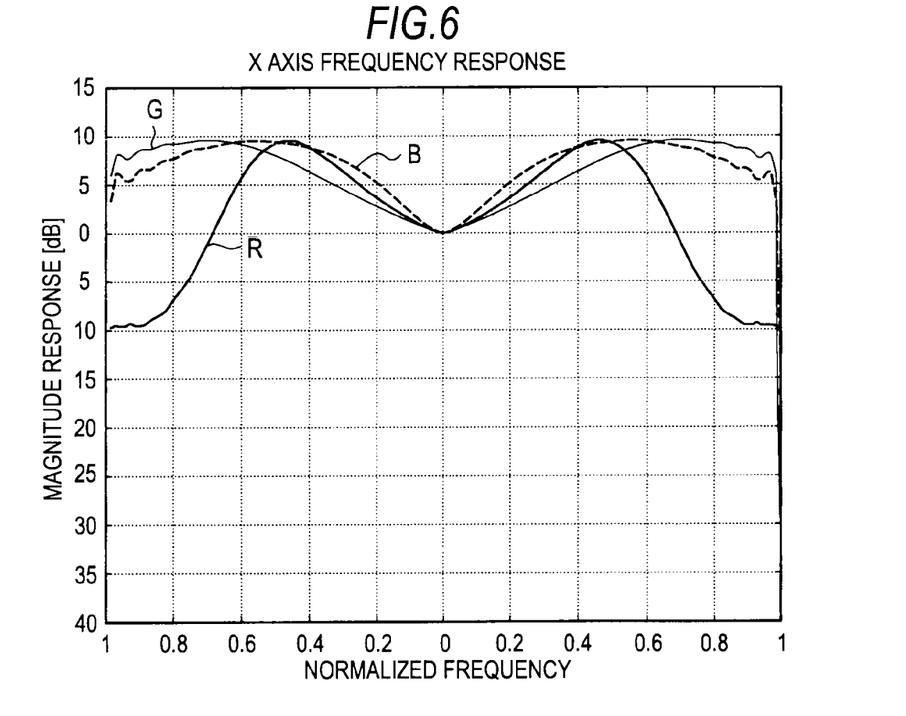
FIG. 6 is a graph showing a Y-axis profile of two-dimensional frequency response of inverse filters designed by the signal processing section as a comparative example.
Figure 7:
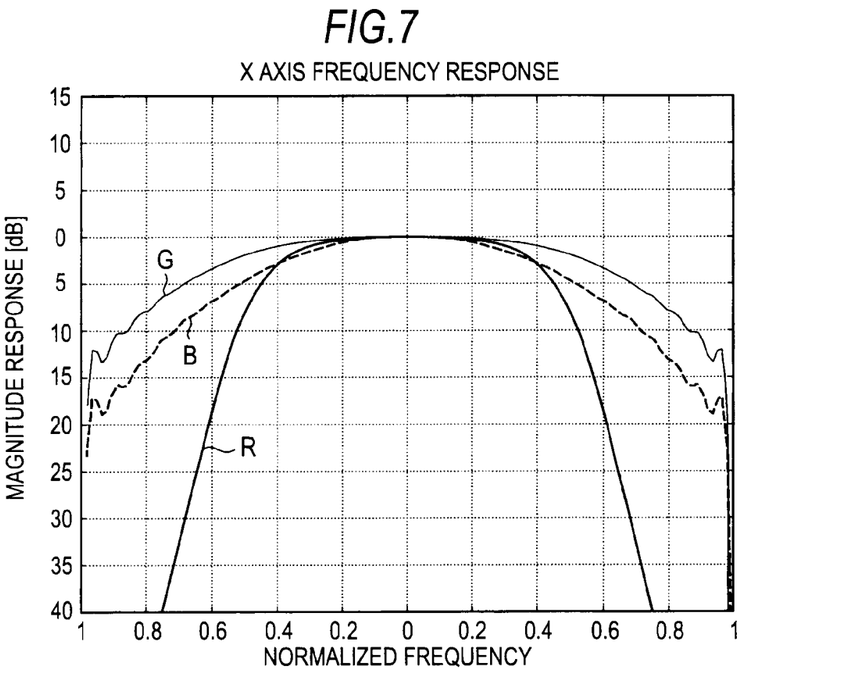
FIG. 7 is a graph showing a Y-axis profile of two-dimensional frequency response of an image reconstructed by the signal processing section as a comparative example.

FIG. 6 is a graph showing a Y-axis profile of two-dimensional frequency response of inverse filters designed by the signal processing section 80 as a comparative example. FIG. 7 is a graph showing a Y-axis profile of two-dimensional frequency response of an image reconstructed by the signal processing section 80 as a comparative example. In FIGS. 6 and 7, R, B, and G components are represented by a solid line, a broken line, and a thin line, respectively.
(Background of the Embodiments)
As shown in FIG. 6, the inverse filters for G and B components of the comparative example raise even a frequency of 0.5 or higher by 10 dB or more where it is assumed that the Nyquist frequency is 1. However, most of high frequency components which have passed through an imaging lens are noises rather than image components. Therefore, the reconstruction method of the comparative example has a problem in that it amplifies not only the resolution of an image but also noise components.

When the reconstruction method of the comparative example is used for the Bayer pattern image shown in FIG. 2, since G components have a bandwidth twice as large as those of R and B components, undesirable coloring may appear on a resultant image. As shown in FIG. 7, while G and B components a reconstructed up to high bands, R components abruptly decrease at a frequency of about 0.4. The resultant reconstructed image therefore has red coloring.

There is an image processing method including the steps of dividing frequency components of an input image into several bands using a band division filter and convolving only low frequency components of the input image with inverse functions of point spread functions. Such an image processing method will now be described with reference to FIGS. 8 and 9.

Figure 8:
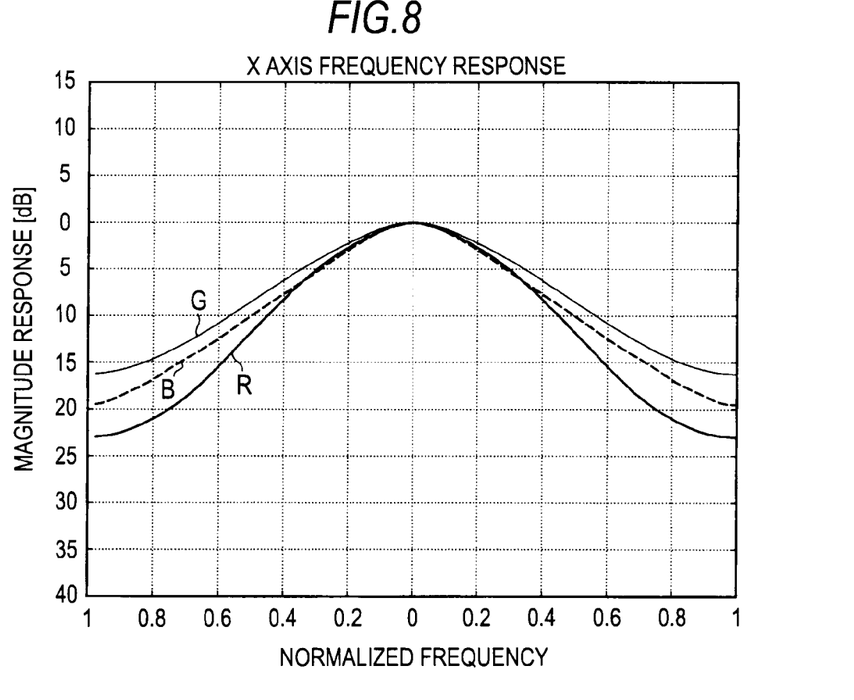
FIG. 8 is a graph showing a Y-axis profile of two-dimensional frequency response of an input image.
Figure 9:
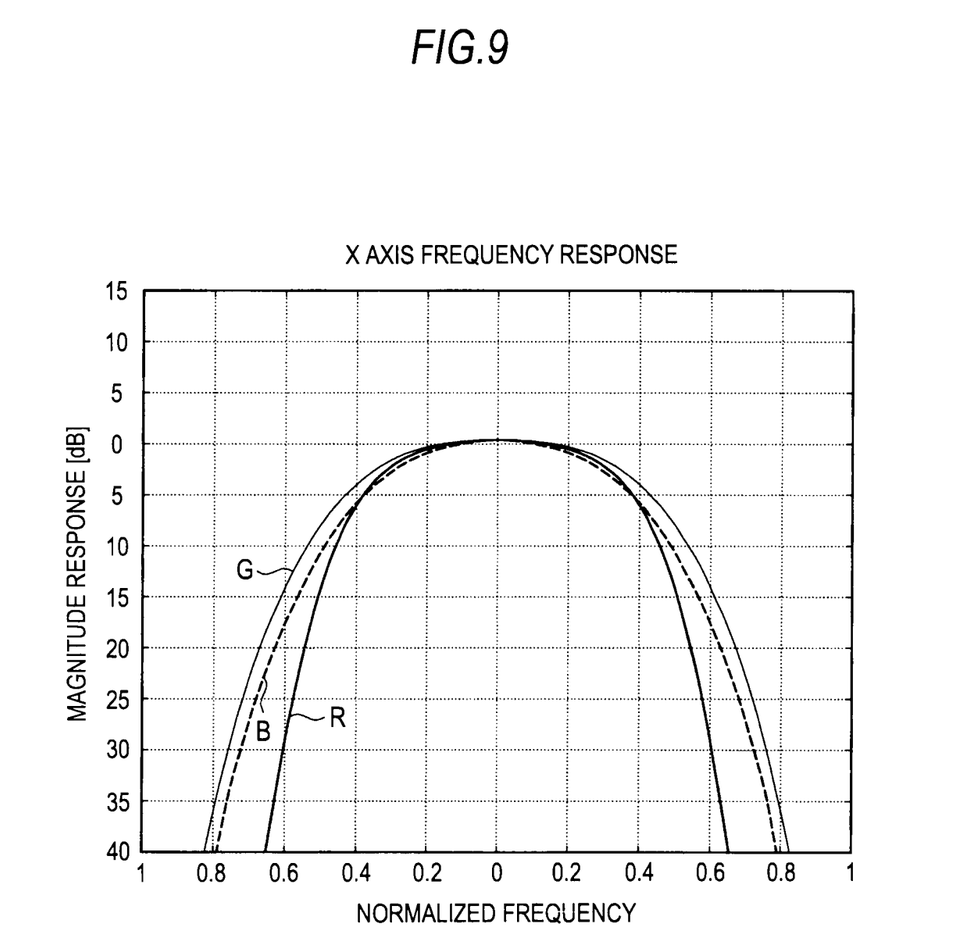
FIG. 9 is a graph showing a Y-axis profile of two-dimensional frequency response of results of reconstruction of the input image shown in FIG. 8 obtained according to an image processing method as a comparative example.

FIG. 8 is a graph showing a Y-axis profile of two-dimensional frequency response of a certain input image. FIG. 9 is a graph showing a Y-axis profile of two-dimensional frequency response of results of reconstruction of the input image shown in FIG. 8 obtained according to the image processing method as a comparative example. As shown in FIG. 9, the profile according to this image processing method is unlike the two-dimensional frequency response shown in FIG. 7 in that all color components start decreasing at a frequency of about 0.3, and the problem of coloring can therefore be eliminated. However, since low frequency components are not sufficiently raised, the method has a problem in that the reconstruction effect is insufficient.

Embodiments of the present disclosure have been conceived taking the above-described situations into consideration, and the embodiments of the present disclosure allow the quality of an image obtained by an imaging optical system 10 to be improved in terms of coloring and resolution. Such embodiments of the present disclosure will now be described in detail.

<3. First Embodiment>
[3-1. Configuration of Signal Processing Section of First Embodiment]

Figure 10:
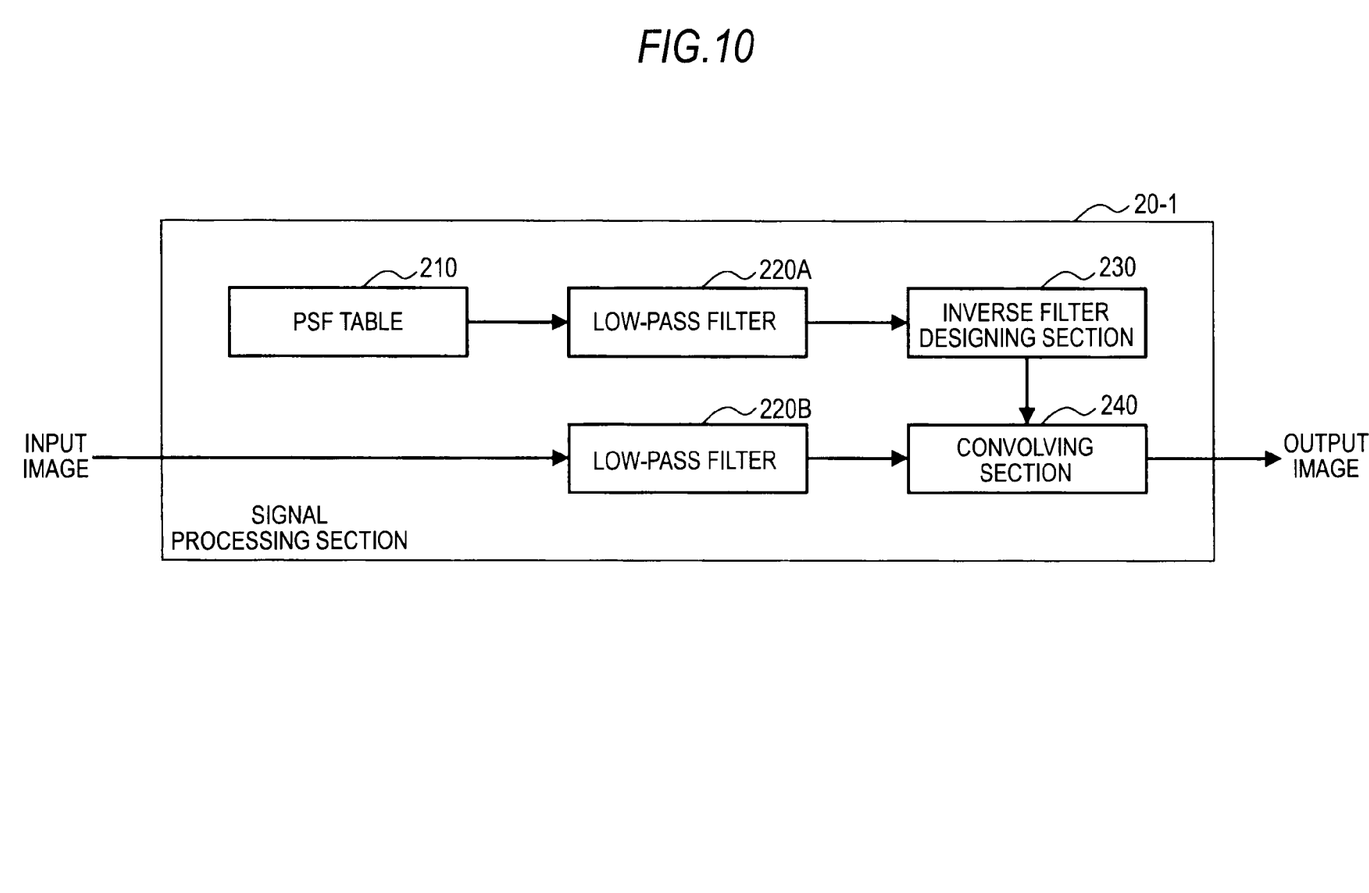
FIG. 10 is a functional block diagram showing a configuration of a signal processing section according to a first embodiment of the present disclosure.

FIG. 10 is a functional block diagram showing a configuration of a signal processing section 20-1 according to a first embodiment of the present disclosure. As shown in FIG. 10, the signal processing section 20-1 according to the first embodiment includes a PSF table 210, low-pass filters 220A and 220B, an inverse filter designing section 230, and a convolving section 240.

Point spread functions P(z) which are defined in association with each of R, G, and B components and each of pixels are held in the PSF table 210. The point spread functions are non-uniformly distributed in a screen, and differences between the point spread functions of pixels neighboring each other are not necessarily large. Therefore, point spread functions within a block having a certain expanse maybe uniformly approximated. For example, the point spread functions are acquired using the method disclosed in Patent Document 1. Alternatively, the point spread functions used may be optical design values.

The low-pass filters 220A calculate low frequency components $P_a(z)$ of point spread functions P(z) of each color by filtering the point spread functions P(z) of each color as shown in Expression 4. In Expression 4, $L_{ar}(z)$, $L_{ag}(z)$, and $L_{ab}(z)$ represent a low-pass filter 220A for R components, a low-pass filter 220A for G components, and a low-pass filter 220A for B components, respectively.

$$P_{ar}(z)=L_{ar}(z)P_r(z)$$

$$P_{ag}(z)=L_{ag}(z)P_g(z)$$

$$P_{ab}(z)=L_{ab}(z)P_b(z) \quad \text{Expression 4}$$

The inverse filter designing section 230 designs an inverse filter $K_a(z)$ whose characteristics are the inverse of the characteristics of a point spread function $P_a(z)$ obtained by the low-pass filter 220A in association with each of R, G, and B components and each pixel. For example, the inverse filter designing section 230 designs inverse filters $K_a(z)$ using the method disclosed in Patent Document 1 or a method of minimizing a mean square error from an input signal based on a wiener filter.

Specifically, the inverse filter designing section 230 can design an inverse filter $K_a(z)$ by calculating frequency response $K_a(w)$ of an inverse filter according to Expression 5 shown below and performing an inverse Fourier transform of frequency response $K_a(w)$ of the inverse filter. In Expression 5, $P_a(w)$ represents frequency response of a PSF, and N(w) represents frequency response of a noise component. The inverse filter designing section 230 calculates the inverse filter $K_r(z)$, $K_g(z)$ and $K_b(z)$ in association with each of R, G and B components and each pixel, though it is omitted in Expression 5. The inverse filters need not be the strict inverse of the characteristics of the PSF $P_a(z)$, but may be a compensation filter compensating for at least apart of signal degradation attributable to the PSF $P_a(z)$.

$$K_a(w) = \frac{P_a^*(w)}{P(w)P_a^*(w) + N(w)} \quad \text{Expression 5}$$

The low-pass filter 220B filters R, G, and B components of an input image X(z) in a Bayer pattern as shown in FIG. 6 to calculate filtered input images $X_{ar}(z)$, $X_{ag}(z)$, and $X_{ab}(z)$, respectively. The low-pass filter 220B may have the same frequency characteristics as those of the low-pas filter 220A.

$$X_{ar}(z)=L_{ar}(z)X_r(z)$$

$$X_{ag}(z)=L_{ag}(z)X_g(z)$$

$$X_{ab}(z)=L_{ab}(z)X_b(z) \quad \text{Expression 6}$$

The convolving section 240 convolves input images $X_{ar}(z)$, $X_{ag}(z)$, and $X_{ab}(z)$ obtained by the filtering at the low-pass filter 220B with inverse filters $K_{ar}(z)$, $K_{ag}(z)$, and $K_{ab}(z)$ designed by the inverse filter designing section 230, respectively. Such calculations performed by the convolving section 240 are shown below as Expression 7.

$$Y_{ar}(z)=K_{ar}(z)X_{ar}(z)$$

$$Y_{ag}(z)=K_{ag}(z)X_{ag}(z)$$

$$Y_{ab}(z)=K_{ab}(z)X_{ab}(z) \quad \text{Expression 7}$$

Advantages of the first embodiment of the present disclosure will now be described with reference to FIG. 11.

Figure 11:
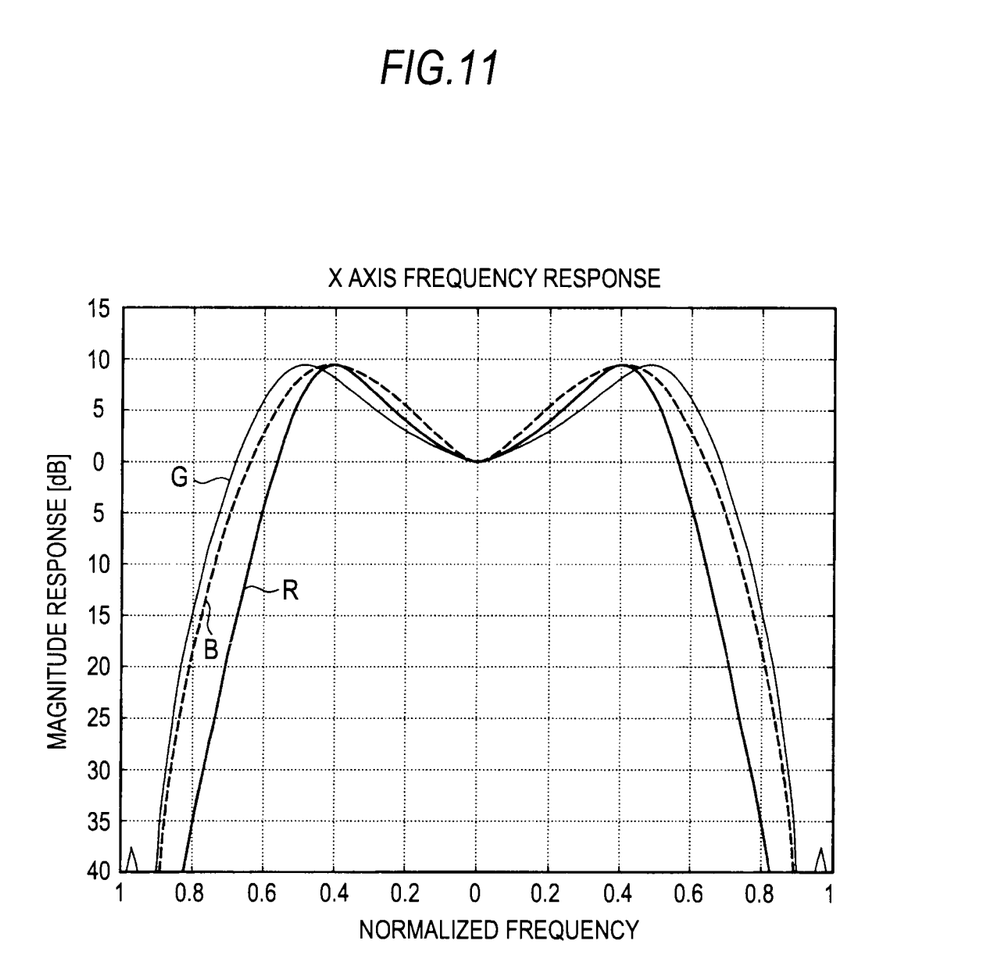
FIG. 11 is a graph showing a Y-axis profile of two-dimensional frequency response of inverse filters designed in the first embodiment.

FIG. 11 is a graph showing a Y-axis profile of two-dimensional frequency response of the inverse filters designed in the first embodiment. As shown in FIG. 11, when compared to the inverse filters of the comparative example shown in FIG. 6, the use of the inverse filters designed in the first embodiment result in smaller differences between the characteristics of R, G, and B components obtained. The problem of coloring is therefore eliminated. The inverse filters designed in the first embodiment are similar to the inverse filters of the comparative example shown in FIG. 6 in that the filters raise low frequency components by 10 dB or more when reconstructing them. The inverse filters designed in the first embodiment have weak frequency response to high frequency components because of the filtering performed by the low-pass filters 220. Therefore, the amount of amplification of noise components can be kept small.

[3-2. Operations of First Embodiment]

A configuration of the signal processing section 20-1 according to the first embodiment of the present disclosure has been described above. Operations of the first embodiment of the present disclosure will now be described with reference to FIG. 12.

Figure 12:
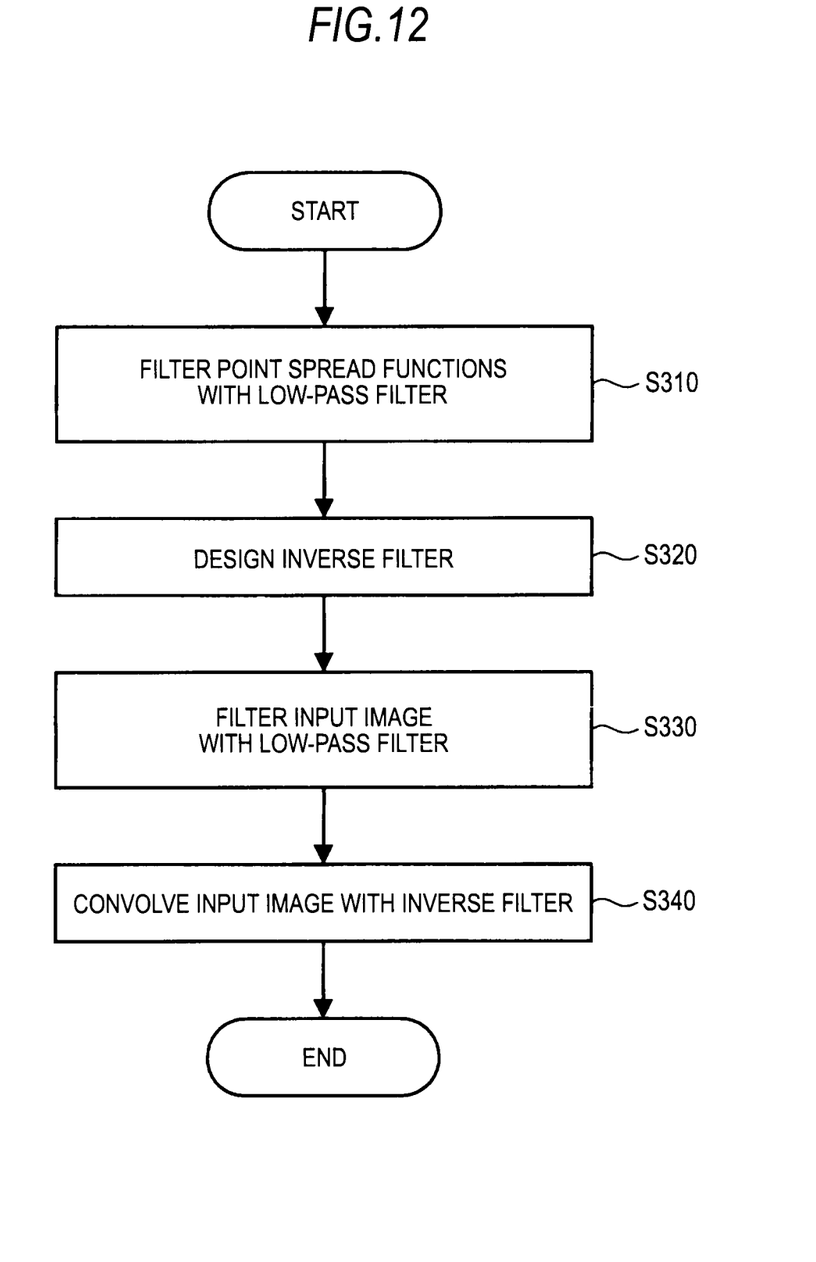
FIG. 12 is a flow chart showing operations of the first embodiment of the present disclosure.

FIG. 12 is a flow chart showing operations of the first embodiment of the present disclosure. As shown in FIG. 12, the low-pass filter 220A filters point spread functions P(z) of each color as shown in Expression 4 to calculate a point spread function $P_a(z)$ for each color (step S310).

Next, the inverse filter designing section 230 designs an inverse filter $K_a(z)$ whose characteristics are the inverse of the characteristics of the point spread function $P_a(z)$ obtained by the filtering at the low-pass filter 220A in association with each of R, G, and B components and each pixel (step S320).

The low-pass filter 220B filters R, G, and B components of an input image X (z) in a Bayer pattern as shown in Expression 6 to calculate filtered input images $X_{ar}(z)$, $X_{ag}(z)$, and $X_{ab}(z)$, respectively (step S330).

Thereafter, the convolving section 240 convolves the input images $X_{ar}(z)$, $X_{ag}(z)$, and $X_{ab}(z)$ obtained by the filtering at the low-pass filter 220B with inverse filters $K_{ar}(z)$, $K_{ag}(z)$, and $K_{ab}(z)$ designed by the inverse filter designing section 230, respectively (step S340). As a result, an output image $Y_a(z)$ is obtained.

<4. Second Embodiment>

The first embodiment of the present disclosure has been described above. A second embodiment of the present disclosure will now be described with reference to FIGS. 13 to 17.

[4-1. Configuration of Signal Processing Section of Second Embodiment]

Figure 13:
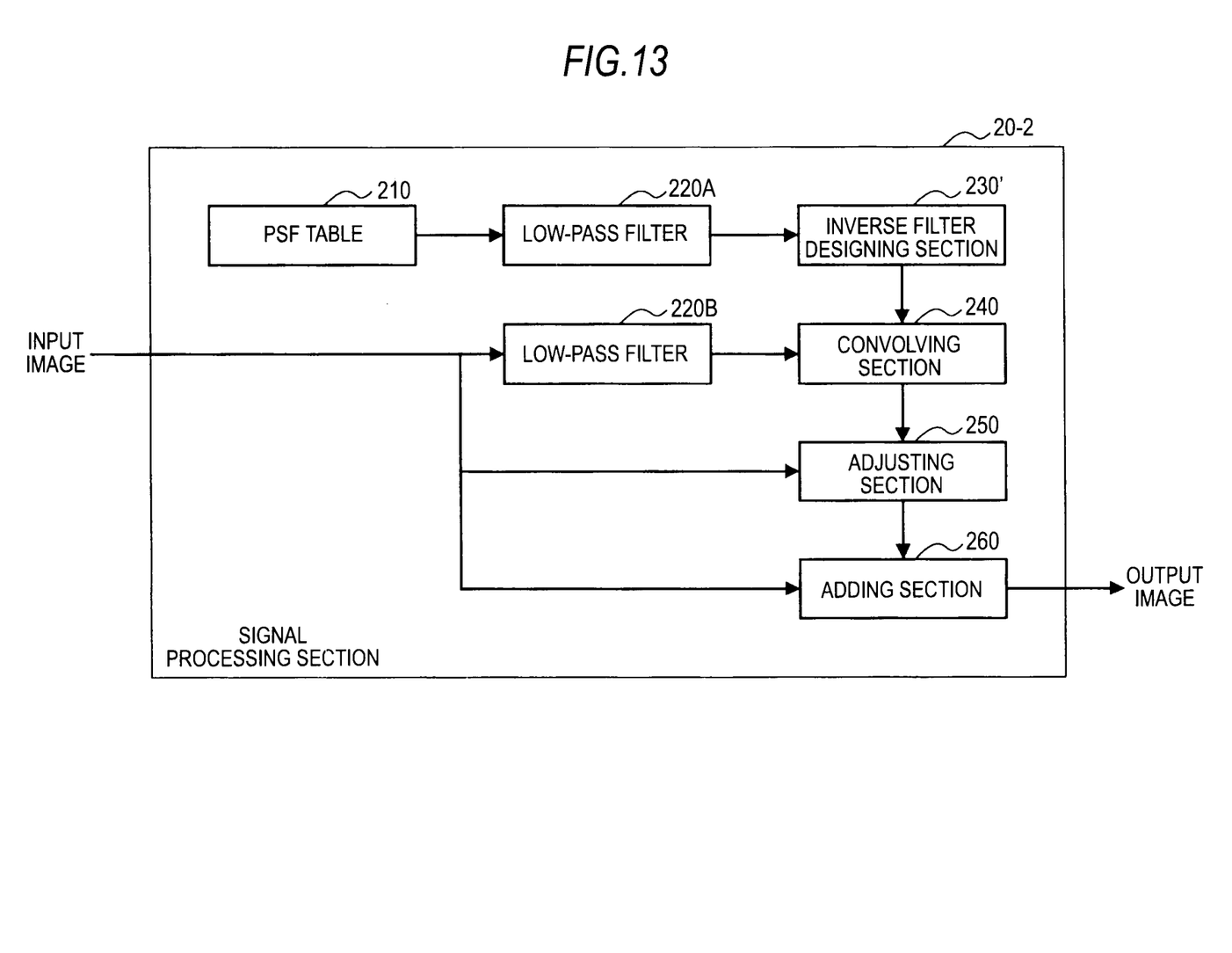
FIG. 13 is a diagram showing a configuration of a signal processing section according to a second embodiment of the present disclosure.

FIG. 13 is a diagram showing a configuration of a signal processing section 20-2 according to the second embodiment of the present disclosure. As shown in FIG. 13, the signal processing section 20-2 according to the second embodiment includes a PSF table 210, low-pass filters 220A and 220B, an inverse filter designing section 230', a convolving section 240, and adjusting section 250, and an adding section 260. The PSF table 210 and the low-pass filters 220A and 220B will not be described in detail because they have already been addressed in the above description of the first embodiment.

The inverse filter designing section 230' designs inverse filters $K_a(z)$ whose characteristics are the inverse of the characteristics of point spread functions $P_a(z)$ obtained by filtering performed by the low-pass filter 220A in association with each of R, G, and B components and each pixel.

Specifically, the inverse filter designing section 230' can design an inverse filter $K_a(z)$ by calculating frequency response $K_a(w)$ of an inverse filter according to Expression 8 shown below and performing an inverse Fourier transform of frequency response $K_a(w)$ of the inverse filter. In Expression 8, $P_a(w)$ represents frequency response of a point spread function obtained after the filtering. $P^*_a(w)$ represents the complex conjugate of the frequency response $P_a(w)$. N(w) represents frequency response of a noise component. The inverse filter designing section 230' calculates the inverse filter $K_r(z)$, $K_g(z)$ and $K_b(z)$ in association with each of R, G and B components and each pixel, though it is omitted in Expression 8.

$$K_a(w) = J_a(w) - 1$$

$$J_a(w) = \frac{P^*_a(w)}{P_a(w)P^*_a(w) + N(w)}$$

Expression 8

The convolving section 240 convolves input images $X_{ar}(z)$, $X_{ag}(z)$, and $X_{ab}(z)$ obtained by the filtering at the low-pass filter 220B with inverse filters $K_{ar}(z)$, $K_{ag}(z)$, and $K_{ab}(z)$ designed by the inverse filter designing section 230', respectively. Such calculations performed by the convolving section 240 are shown below as Expression 9.

$$Y_{ar}(z) = K_{ar}(z)X_{ar}(z)$$

$$Y_{ag}(z) = K_{ag}(z)X_{ag}(z)$$

$$Y_{ab}(z) = K_{ab}(z)X_{ab}(z)$$

Expression 9

Figure 14:
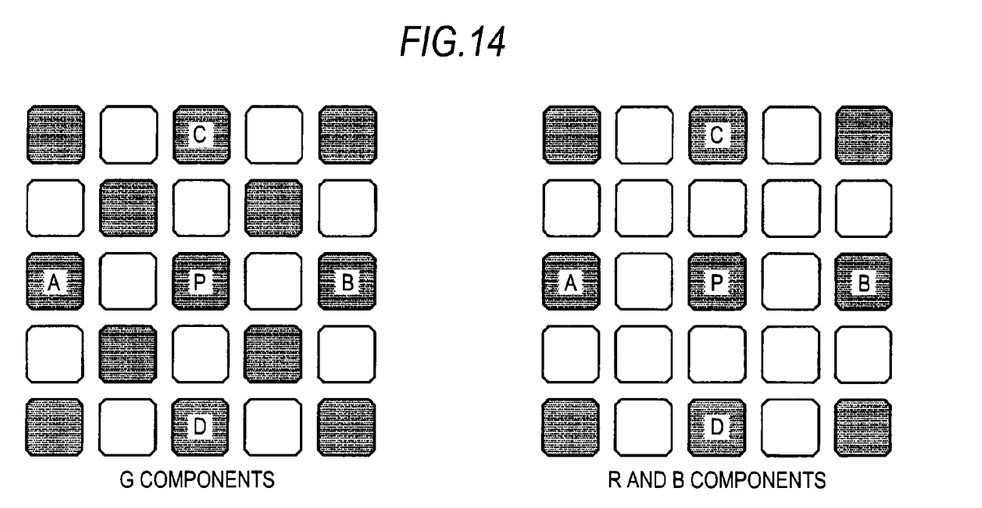
FIG. 14 is an illustration showing the positions of pixels used for calculating edge information.
Figure 15:
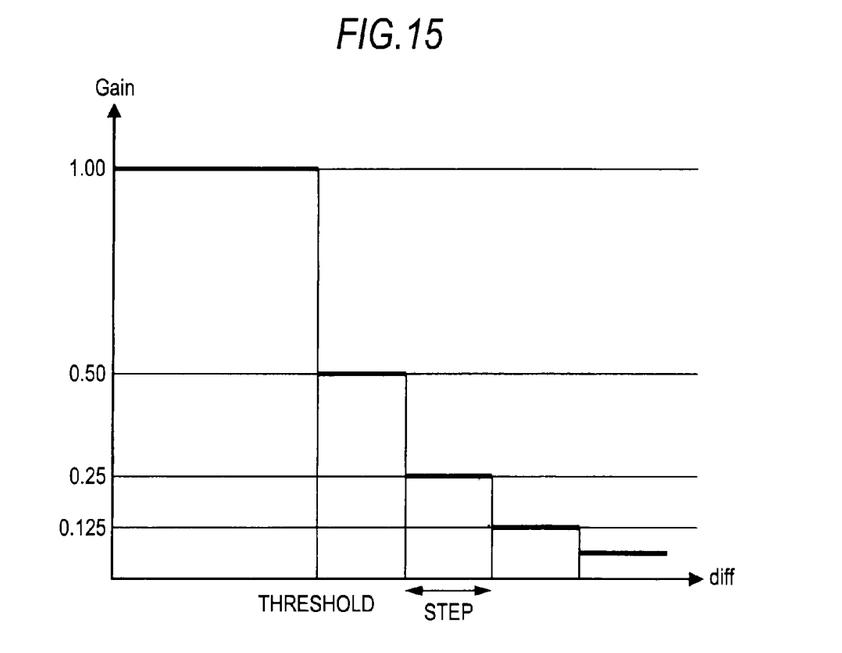
FIG. 15 is a graph showing a relationship between edge information and a gain.

The adjusting section 250 adjusts a result $Y_a(z)$ of convolution of a certain pixel of interest performed by the convolving section 240 based on edge information of the neighborhood of the pixel of interest. Specifically, the adjusting section 250 first calculates edge information Diff of the neighborhood of the pixel of interest as shown in Expression 10. Pixels A, B, C, and D in Expression 10 are located as shown in FIG. 14 with respect to a pixel of interest P. The adjusting section 250 may calculate edge information Diff in the neighborhood of a pixel of interest in an input image. Edge information Diff in the neighborhood of a pixel of interest may alternatively be calculated from a result of convolution performed by the convolving section 240.

$$\text{Diff} = \text{abs}(A-B) + \text{abs}(C-D)$$

Expression 10

The adjusting section 250 calculates a gain G according to the edge information Diff. For example, the adjusting section 250 may calculate the gain G according to the relationship between the edge information Diff and the gain G shown in FIG. 15. According to the relationship shown in FIG. 15, the gain G is calculated at 1.00 when the edge information Diff is equal to or smaller than a threshold, and the gain G decreases stepwise when the edge information Diff exceeds the threshold.

Further, the adjusting section 250 adjusts the result $Y_a(z)$ of the convolution performed by the convolving section 240 according to the calculated gain G as shown in Expression 11.

$$Z_{ar}(z) = G_r(z)Y_{ar}(z)$$

$$Z_{ag}(z) = G_g(z)Y_{ag}(z)$$

$$Z_{ab}(z) = G_b(z)Y_{ab}(z)$$

Expression 11

The edge information Diff has a greater value, the stronger edge components in the neighborhood of the pixel P of interest. Therefore, the gain G associated with the pixel P of interest has a smaller value, the stronger the edge components in the neighborhood of the pixel P of interest. It is therefore prevent a resultant output image from becoming unnatural because of excessive highlighting of edge regions.

The adding section 260 adds results $Z_a(z)$ of the adjustment performed by the adjusting section 250 to the input image X(z) as shown in FIG. 12 to obtain an output image O(z).

$$O_r(z) = X_r(z)Z_{ar}(z)$$

$$O_g(z) = X_g(z)Z_{ag}(z)$$

$$O_b(z) = X_b(z)Z_{ab}(z)$$

Expression 12

[4-2. Operations of Second Embodiment]

A configuration of the signal processing section 20-2 according to the second embodiment of the present disclosure has been described above. Operations of the second embodiment of the present disclosure will now be described with reference to FIG. 16.

Figure 16:
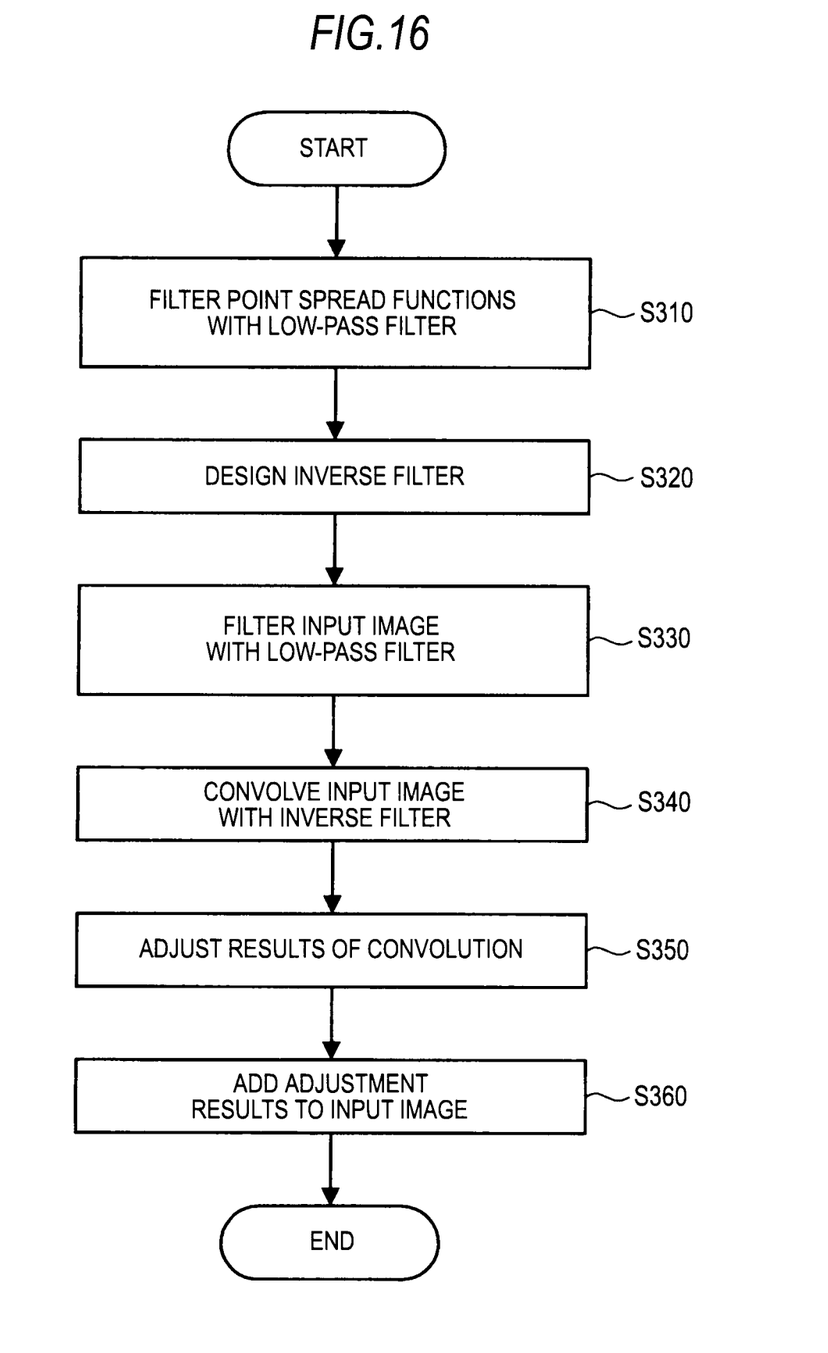
FIG. 16 is a flow chart showing operations of the second embodiment of the present disclosure.

FIG. 16 is a flow chart showing operations of the second embodiment of the present disclosure. As shown in FIG. 16, the low-pass filter 220A filters point spread functions P(z) of each color as shown in Expression 4 to calculate a point spread function $P_a(z)$ for each color (step S310).

Next, the inverse filter designing section 230' designs an inverse filter $K_a(z)$ whose characteristics are the inverse of the characteristics of the point spread function $P_a(z)$ obtained by the filtering at the low-pass filter 220A in association with each of R, G, and B components and each pixel (step S320).

The low-pass filter 220B filters R, G, and B components of an input image X (z) in a Bayer pattern as shown in Expression 6 to calculate filtered input images $X_{ar}(z)$, $X_{ag}(z)$, and $X_{ab}(z)$, respectively (step S330).

Thereafter, the convolving section 240 convolves the input images $X_{ar}(z)$, $X_{ag}(z)$, and $X_{ab}(z)$ obtained by the filtering at the low-pass filter 220B with inverse filters $K_{ar}(z)$, $K_{ag}(z)$, and $K_{ab}(z)$ designed by the inverse filter designing section 230', respectively (step S340).

Next, the adjusting section 250 adjusts a result $Y_a(z)$ of convolution of a certain pixel of interest performed by the convolving section 240 based on edge information of the neighborhood of the pixel of interest (step S350). The adding section 260 adds results $Z_a(z)$ of the adjustment performed by the adjusting section 250 to the input image $X(z)$ to obtain an output image $O(z)$.

Advantages of the second embodiment of the present disclosure will now be described with reference to FIG. 17.

Figure 17:
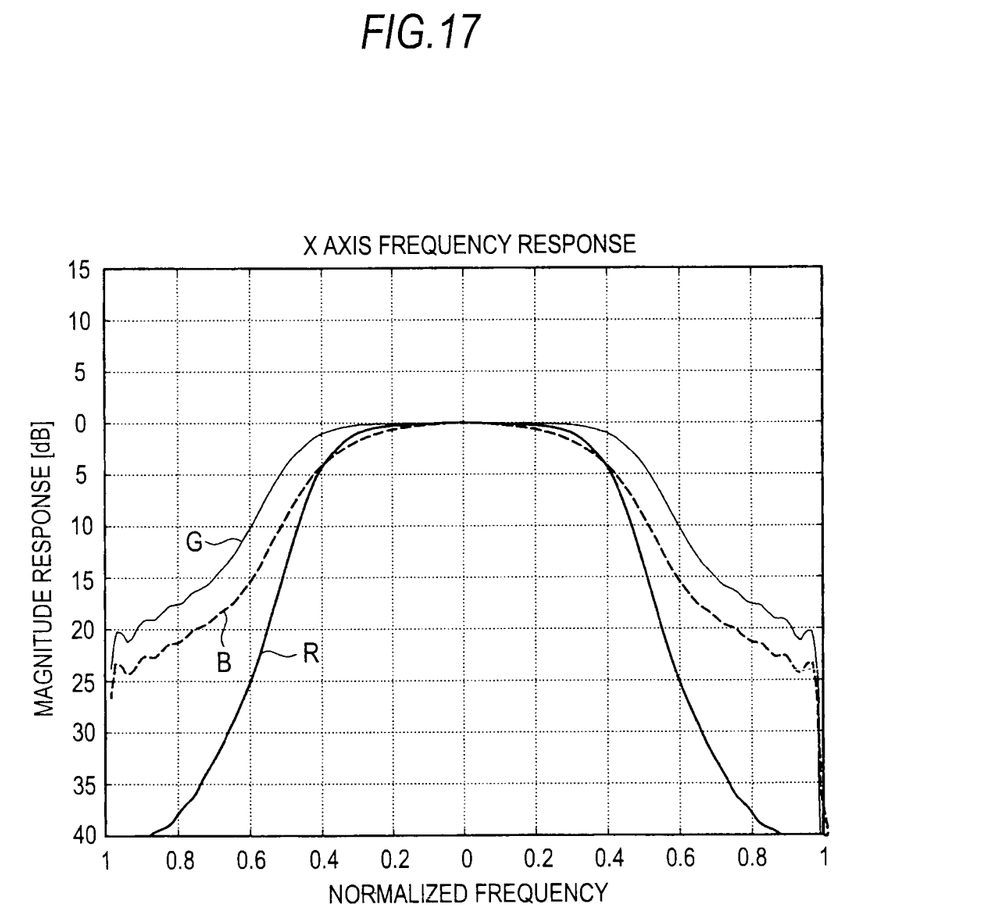
FIG. 17 is a graph showing a Y-axis profile of two-dimensional frequency response of an image reconstructed according to the second embodiment of the present disclosure.

FIG. 17 is a graph showing a Y-axis profile of two-dimensional frequency response of an image reconstructed according to the second embodiment of the present disclosure. As shown in FIG. 17, when compared to the image processing method of the comparative example shown in FIG. 9, the second embodiment of the present disclosure is advantageous in that low frequency components up to a frequency of about 0.4 can be sufficiently reconstructed. In the second embodiment of the present disclosure, all color components decrease at a frequency of about 0.4 as shown in FIG. 17, and the problem of coloring is therefore eliminated. Further, since high frequency components are decreased by −10 dB or more, high frequency noise components are not amplified. Further, the adjustment performed by the adjusting section 250 based on edge information mitigates the problem of blackening of pixels which can occur at edge regions represented in black and white.

<5. Summary of the Description>

As described above, the embodiments of the present disclosure make it possible to design inverse filters having such characteristics that differences between R, G and B components are suppressed, and the problem of undesirable coloring of an output image can therefore be eliminated. According to the embodiments of the present disclosure, low frequency components up to about a frequency of 0.4 can be sufficiently reconstructed when compared to the image processing method of the comparative example while avoiding the amplification of noise components in high frequency bands.

Embodiments of the present disclosure have been described in detail with reference to the accompanying drawings, but the present disclosure is not limited to such embodiments. Those having normal knowledge of the field of the present disclosure will obviously be able to conceive various alterations and modifications within the scope of the technical idea disclosed herein, and it should be understood that such alterations and modifications are obviously included in the scope of the technical idea of the present disclosure.

For example, although image processing apparatus compensating an input image convolved with point spread functions have been described above, the present disclosure is not limited to such examples. Point spread functions are merely mentioned as an example of impulse response. Input images are merely an example of data signals. Image processing apparatus are merely an example of signal processing apparatus compensating a data signal convolved with impulse response. The present disclosure applies to signal processing apparatus in general which compensate a data signal convolved with impulse response.

The steps of the process of the signal processing section 20 described in the present disclosure are not necessarily required to be performed in a time sequential manner in the order in which the steps are shown in the flow chart. For example, the steps of the process of the signal processing section 20 may be performed in an order different from the order the steps are shown in the flow chart. The steps may alternatively be performed in parallel. The hardware incorporated in the image processing apparatus 1 such as the CPU, ROM, and RAM may be replaced with computer programs created to provide functions equivalent to the functions of the various features of the signal processing section 20 described above. Such computer programs may be provided in the form of a storage medium having the programs stored therein.

The present disclosure contains subject matter related to that disclosed in Japanese Priority Patent Application JP 2010-293307 filed in the Japan Patent Office on Dec. 28, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus comprising:
one or more processors being operable to:
filter a data signal;
generate results by convolving low frequency components of the data signal obtained by a first low-pass filter with a compensation filter for compensating for signal degradation attributable to low frequency components of impulse response obtained by filtering the impulse response with a second low-pass filter; and
adjust the generated results based on a gain, wherein the gain is calculated according to edge information of a region of the data signal.

2. A signal processing apparatus according to claim 1, wherein the first low-pass filter and the second low-pass filter have same characteristics.

3. A signal processing apparatus according to claim 2, wherein said one or more processors are operable to add the results of the convolution and the data signal.

4. A signal processing apparatus according to claim 1, wherein the one or more processors are operable to add the results of the adjustment with the data signal.

5. The signal processing apparatus according to claim 1, wherein the impulse response is a point spread function.

6. A signal processing apparatus according to claim 1, wherein the one or more processors are operable to calculate the gain based on the edge information of the region.

7. A signal processing apparatus according to claim 6, wherein the gain decreases stepwise for the edge information of the region is greater than the pre-determined threshold.

8. A signal processing apparatus according to claim 7, wherein magnitude of the edge information of the region is directly proportional to strength of edge components in a neighborhood of a pixel of interest.

9. A signal processing apparatus according to claim 8, wherein magnitude of the gain associated with the pixel of interest is inversely proportional to the strength of the edge components in the neighborhood of the pixel of interest.

10. A signal processing apparatus comprising:
a first low-pass filter filtering a data signal, wherein the data signal is an image signal;
a convolving section generating results by convolving low frequency components of the data signal obtained by the first low-pass filter with a compensation filter for compensating for signal degradation attributable to low frequency components of impulse response obtained by filtering the impulse response with a second low-pass filter, wherein the first low-pass filter and the second low-pass filter have same characteristics;

an adjusting section adjusting the results of convolution associated with a region performed by the convolving section based on edge information of the region; and an adding section adding the results of the adjustment performed by the adjusting section and the data signal.

11. A signal processing apparatus according to claim 10, wherein the adjusting section adjusts the results of convolution associated with the region based on the edge information such that for weaker edge components in the region, a higher gain is obtained.

12. A signal processing apparatus according to claim 11, wherein the adjusting section adjusts the results of convolution associated with the region based on the edge information of the region in the data signal or in the results of convolution.

13. A signal processing apparatus according to claim 12, wherein the data signal is an image signal imaged by an imaging optical system; and the impulse response is a point spread function of the imaging optical system.

14. A signal processing method comprising:
filtering a data signal with a first low-pass filter;
filtering impulse response with a second low-pass filter;
designing a compensation filter compensating for signal degradation attributable to low frequency components of the impulse response obtained with the second low-pass filter;
convolving low frequency components of the data signal obtained by the first low-pass filter with the compensation filter to generate results; and
adjusting the generated results based on a gain, wherein the gain is calculated according to edge information of a region of the data signal.

15. A signal processing method according to claim 14, wherein the first low-pass filter and the second low-pass filter have same characteristics.

16. A signal processing method according to claim 14, comprising designing an inverse filter of a point spread function in association with three color components of an image signal.

17. A signal processing method according to claim 16, comprising convolving the three color components of the image signal in a Bayer pattern with an inverse filter for a first color component, an inverse filter for a second color component, and an inverse filter for a third color component, respectively.

18. A signal processing method according to claim 17, comprising adding the results of convolution to the three color components of the image signal and outputting an output image.

19. The signal processing apparatus according to claim 18, wherein the compensation filter for compensating for the signal degradation is attributable to the point spread function.

20. A non-transitory computer-readable storage medium having stored thereon, a computer program having at least one code section for signal processing, the at least one code section being executable by a computer for causing the computer to perform steps comprising:
filtering a data signal; and
convolving low frequency components of the data signal obtained by the first low-pass filter with a compensation filter for compensating for signal degradation attributable to low frequency components of impulse response obtained by filtering the impulse response with a second low-pass filter; and
adjusting the generated results based on a gain, wherein the gain is calculated according to edge information of a region of the data signal.

* * * * *